United States Patent
Kesler

(10) Patent No.: US 10,585,720 B1
(45) Date of Patent: Mar. 10, 2020

(54) METHOD AND SYSTEM FOR EXECUTING APPLICATION PROGRAMMING INTERFACE (API) REQUESTS BASED ON UNION RELATIONSHIPS BETWEEN OBJECTS

(71) Applicant: INTUIT INC., Mountain View, CA (US)

(72) Inventor: Grigoriy Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 13 days.

(21) Appl. No.: 15/995,676

(22) Filed: Jun. 1, 2018

(51) Int. Cl.
G06F 3/00 (2006.01)
G06F 9/44 (2018.01)
G06F 9/46 (2006.01)
G06F 13/00 (2006.01)
G06F 9/54 (2006.01)
G06F 9/448 (2018.01)
G06F 16/21 (2019.01)
G06F 16/2453 (2019.01)

(52) U.S. Cl.
CPC ............. *G06F 9/54* (2013.01); *G06F 9/448* (2018.02); *G06F 16/211* (2019.01); *G06F 16/2453* (2019.01)

(58) Field of Classification Search
CPC ........................................................ G06F 9/54
USPC ........................................................ 719/328
See application file for complete search history.

(56) References Cited

U.S. PATENT DOCUMENTS

2014/0172914 A1* 6/2014 Elnikety ............. G06F 16/9024
707/774

* cited by examiner

*Primary Examiner* — Timothy A Mudrick
(74) *Attorney, Agent, or Firm* — Patterson + Sheridan, LLP

(57) ABSTRACT

Aspects of the present disclosure provide techniques for executing requests in an object schema-based application programming interface (API) based on union relationships between data objects. Embodiments include receiving an API query from a client application. The API query identifies a navigable path through a graph projection of the API and includes a plurality of nodes in the graph. One or more data objects to resolve in order to satisfy the API query are identified based on an object schema associated with each node in the query. For each respective data object of the one or more data objects, one or more services associated with properties of the respective data object are identified, and one or more subqueries are generated to the services to satisfy the properties of the respective data object. The subqueries are transmitted to the identified services for execution, and a result of the API query is returned.

20 Claims, 6 Drawing Sheets

```
{
    invoice : {
        attributes: {
            transactionDate : {
                type : date,
                provider : server1.host.net
            }
            contact : {
                type : contactObject,
                provider : server1.host.net
            }
            lines : {
                type : lineObject[],
                provider : server2.host.net
            }
        }
        provider : server3.host.net
    }
}
```

METHOD AND SYSTEM FOR EXECUTING APPLICATION PROGRAMMING INTERFACE (API) REQUESTS BASED ON UNION RELATIONSHIPS BETWEEN OBJECTS

INTRODUCTION

Aspects of the present disclosure generally relate to object attribute relationships in object schema-based application programming interfaces (APIs), and more specifically to processing API function calls using a graph generated from object schemas defining an API and union relationships defined between objects in the graph.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provide data to the invoked function for processing. In other cases, web-based applications can invoke API functions using queries encapsulated in, for example an HTTP POST request, a Simple Object Access Protocol (SOAP) request, or other protocols that allow client software to invoke functions on a remote system.

API functions generally provide for the ability to commit data objects to a data store or retrieve specified data from a data store. These data objects may include a plurality of attributes that define various properties of the data object to be committed to or retrieved from a data store. The attributes included in a data object may be defined as primitive data types—data types that are natively supported by a programming language (e.g., integers, long integers, single and double precision floating point numbers, characters, strings, Boolean values, etc.)—or other data objects. The attributes included in a data object may also include information identifying the source of each attribute.

To resolve data objects requested when a client application invokes an API function, a system may generate a plurality of queries against a data store to request the specified data objects. In some cases, the plurality of queries may be generated against a single instance of a data store. While data objects may be stored in and retrieved from a single instance of a data store, reliance on a single instance of a data store may have performance and reliability implications. For example, because each API function may result in the generation of a plurality of discrete queries against the data store, processing latencies may occur in the resolution of the requested data objects from the execution of a series of requests for a specific invocation of the API function call. Further, because the queries generated from an API query may not be executed atomically (i.e., all the queries associated with a single API query may not be executed before queries associated with a different API query are executed), additional delays may be introduced into the resolution of the requested data objects. Still further, maintaining a single data store may create a single point of failure for software systems that rely on the data exposed by the API.

Thus, what are needed are systems and methods for efficiently processing API function calls involving the resolution of data objects.

BRIEF SUMMARY

Certain embodiments of the present disclosure provide a computer-implemented method for executing data queries in an object schema-based application programming interface (API). The method generally includes receiving an API query from a client application. The API query generally identifies a navigable path through a graph projection of the API, and the navigable path includes a plurality of nodes in the graph projection of the API. One or more data objects to resolve in order to satisfy the API query are identified, at least in part, on an object schema associated with each node in the API query. For each respective data object of the one or more data objects, one or more services associated with properties of the respective data objects are identified, and one or more subqueries to the identified one or more services are generated in order to satisfy the properties of the respective data object. The API query is executed by transmitting the generated one or more subqueries associated with each data object to the identified one or more services for execution, and a result of the API, generated from the results of the executed one or more subqueries, is returned to the client application.

Other embodiments provide a system comprising a processor and a non-transitory computer-readable medium that when executed, cause the processor to perform an operation for executing data queries in an object schema-based application programming interface (API). The operation generally includes receiving an API query from a client application. The API query generally identifies a navigable path through a graph projection of the API, and the navigable path includes a plurality of nodes in the graph projection of the API. One or more data objects to resolve in order to satisfy the API query are identified, at least in part, on an object schema associated with each node in the API query. For each respective data object of the one or more data objects, one or more services associated with properties of the respective data objects are identified, and one or more subqueries to the identified one or more services are generated in order to satisfy the properties of the respective data object. The API query is executed by transmitting the generated one or more subqueries associated with each data object to the identified one or more services for execution, and a result of the API, generated from the results of the executed one or more subqueries, is returned to the client application.

Still further embodiments provide a system for executing data queries in an object schema-based application programming interface (API). The system generally includes a request processor and one or more data stores storing data associated with one or more data objects. The request processor is generally configured to perform an operation including receiving an API query from a client application. The API query generally identifies a navigable path through a graph projection of the API, and the navigable path includes a plurality of nodes in the graph projection of the API. One or more data objects to resolve in order to satisfy the API query are identified, at least in part, on an object schema associated with each node in the API query. For each respective data object of the one or more data objects, one or more services associated with properties of the respective data objects are identified, and one or more subqueries to the identified one or more services are generated in order to satisfy the properties of the respective data object. The API query is executed by transmitting the generated one or more subqueries associated with each data object to the identified one or more services for execution, and a result of the API, generated from the results of the executed one or more subqueries, is returned to the client application.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example object schema defining an object and a plurality of attribute objects maintained by different services.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for executing API queries originating from a client application using an execution plan generated based on union relationships between different data objects.

An object schema-based API generally exposes function calls as a variety of navigable paths through a graph projection, or representation, of the API. Generally, a graph representation of an API includes a root node and a plurality of child nodes, with each child node representing a function exposed by the API (e.g., to request or write data to a data store, analyze data in a data store, and so on). The graph may be generated using a group of object schema definition files. Each object schema definition file can define one or more nodes (functions). Each node may be defined in terms of the data objects provided by a node, required and optional parameters for functions supported by a node, relationships between nodes (e.g., parent/child nodes), relationships between data objects provided by the node and other data objects that may need to be resolved in order to resolve the data objects provided by the node, providers associated with different attributes of a data object, and so on.

As described in further detail herein, an API function call may request the commitment of a specified data object to a data store or the retrieval of a specified data object from the data store. This specified data object may be defined as an object having a plurality of attributes, which may include attributes defined as primitive data types and attributes defined as other data objects. Each attribute defined for a specified data object also includes information identifying a service that maintains the data for that attribute, and the attributes of a specified data object may be maintained across different services. To resolve an object, a series of subqueries may be generated to resolve each attribute of the object. The series of subqueries may be combined for execution in a union relationship against the one or more services that maintain the attributes of a data object such that data for the attributes of the object are drawn from multiple data sources. In some embodiments, the information defining the attributes of a data object and the services that maintain the defined attributes of a data object may be used to optimize execution of the generated subqueries. This optimization, as described in further detail herein, may be used to reduce the number of subqueries executed against a given service and may be used to cause substantially parallel execution of subqueries for data objects that are independent of each other and maintained by different services.

Example Networked Environment for Executing API Requests

Figure 1:
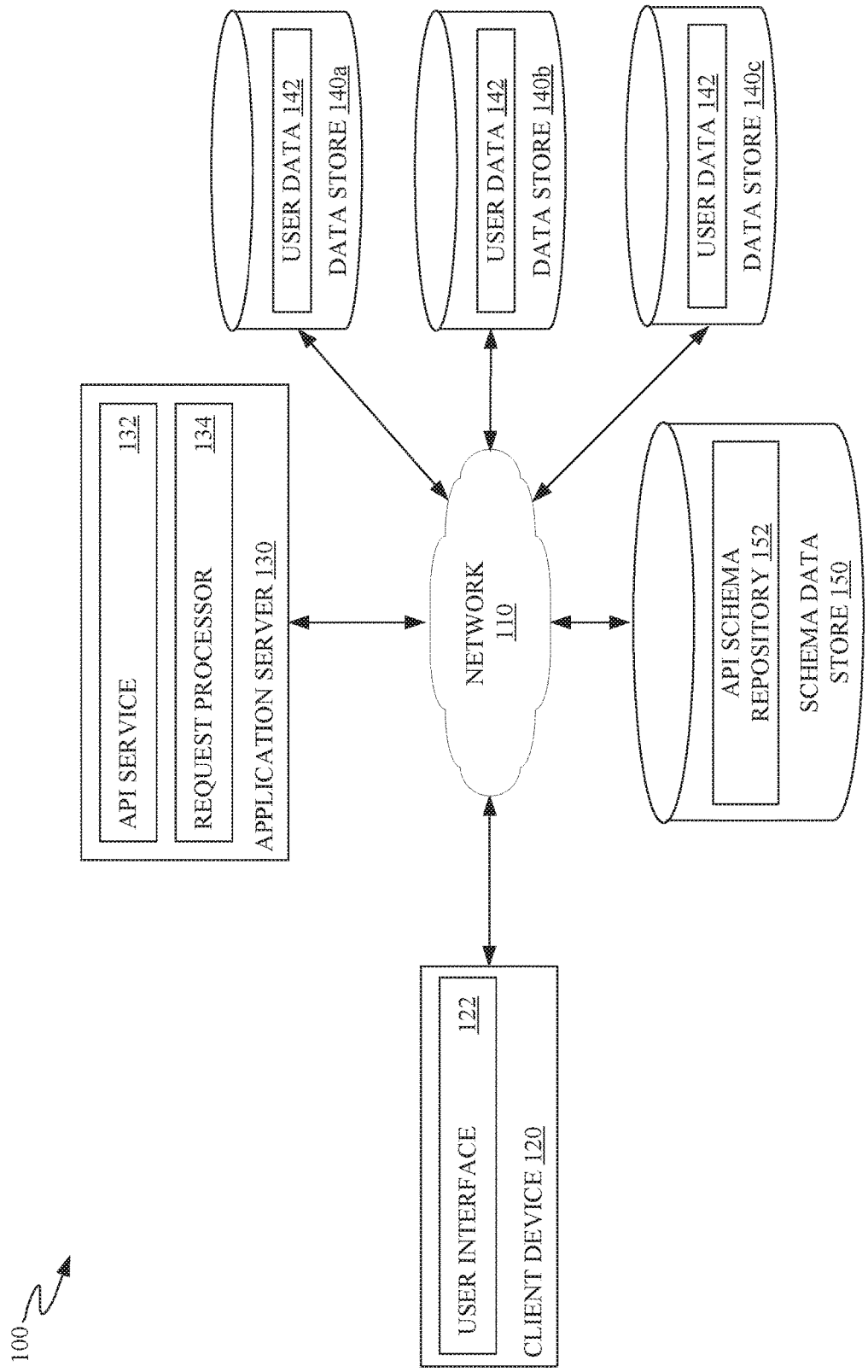
FIG. 1 illustrates an example networked environment in which application programming interface (API) requests originating from a client application are processed against a plurality of data stores using an execution plan generated based on union relationships between different data objects.

FIG. 1 illustrates an example networked environment in which API queries are executed using execution plans generated based on union relationships between data objects, according to an embodiment of the present disclosure. As illustrated, networked environment 100 includes a client device 120, an application server 130, a plurality of data stores 140a-140c, and a schema data store 150, communicatively connected via network 110. While FIG. 1 illustrates three data stores (data stores 140a, 140b, and 140c), but it should be recognized by one of ordinary skill in the art that data used to resolve API requests may be stored across any number of data stores.

Client device 120 generally is illustrative of a variety of connected devices that may be used by a user to access an application or features thereof through application server 130. Client device 120 may be, for example, a desktop computer, a laptop computer, a tablet device, a mobile phone, a smart wearable device, an internet connected appliance, or other computing device with networked communications capabilities. As illustrated, client device 120 includes a user interface 122. User interface 122 generally receives requests from a user of client device 120 for specified application content and invokes one or more functions on application server 130 to execute one or more queries against a data store (e.g., against one or more of data stores 140), as discussed in further detail herein. User interface 122 may be deployed as part of an application installed on client device 120 or provided by application server 130 for applications deployed as a web application with the user interface 122 displayed in a web browser and the functionality of the application executing on application server 130.

Application server 130 generally includes an API service 132 and a request processor 134. API service 132 generally exposes functions supported by the API as a graph projection of API. The graph projection of the API generally includes a plurality of interconnected nodes defined by object schemas (e.g., stored in object schema store 150). These object schemas may define, for example, data objects returned by querying a particular node in the graph projection of the API, attributes of the data objects returned by querying that node in the graph projection of the API, relationships between different data objects defined in the API, functions that can be performed on data objects, services that maintain different attributes, or properties, of data objects defined in the API and the like. In some embodiments, the object schema defining a given data object may explicitly identify a parent data object of the given data object and may explicitly identify the service that maintains the parent data object and the given data object. The API exposed at application gateway 130 generally has a root node, and each request for data interaction (i.e., read and/or write requests) may be defined in relation to a navigable path in the graph (e.g., a path originating at the root node and traversing one or more other nodes in the graph projection of the API).

When API service 132 receives an API query from client device 120, API service 132 traverses the navigable path through the graph projection of the API to identify one or more data objects to resolve in order to satisfy the received API query from object schemas associated with each node in the navigable path. The one or more data objects to resolve may include the data object requested by client device 120 and one or more data objects defined as attributes of the requested data object. These attributes may be primitive data types, which are data types natively supported by a programming language, or object data types, which are data types that serve as a container for related data which themselves may be defined as primitive data types or object data types. The object schemas associated with each of the requested data object and the one or more attribute data objects may further include information identifying the service or system that maintains each object. The information identifying the service or system that maintains each object may be used to generate the subqueries for resolving the data objects and optimize execution of the generated subqueries, as discussed in further detail herein.

To identify the one or more data objects to resolve in order to satisfy the received API query, API service 132 can obtain the object schemas defining each node in the navigable path identified by the API request to identify data objects representative of each node in the navigable path and the attributes of each identified data object. As discussed, the attributes of each identified data object may include information identifying the type of each attribute (i.e., whether an attribute is a primitive data type or an object data type). Where a first object includes attributes that are object data types, those attributes may be considered children data objects to the first data object, which may, in turn, be a child data object of yet another data object. In some embodiments, the object schemas may also identify a service (e.g., a server, a cluster of servers, or some other local or networked resource) that stores the data associated with a data object and against which queries are to be executed in order to resolve the data object.

In some embodiments, parent-child relationships may further be used in addition to union relationships defined for data objects and attributes associated with data objects to define an order in which the one or more data objects are resolved in order to satisfy the received API query, and thus, an order in which the generated subqueries are executed. The one or more child objects may be defined such that the child objects are generally resolved prior to final resolution of the ultimate parent object.

In some embodiments, the API service 132 may use metadata associated with the object schemas defining nodes in the API to identify one or more data objects to resolve in order to satisfy the received API request. This metadata may be generated by converting object schemas in a markup language (e.g., an XML file, a YAML file, a JSON file, etc.) to machine optimized data in order to accelerate the process of identifying the one or more data objects to resolve. The metadata may be generated when the graph projection of the API is initially defined and as extensions are added to the API, and the metadata may be stored locally at application server 130 or at schema data store 150 for future retrieval.

To execute the API query, API service 132 generates a plurality of subqueries against one or more identified services, based on the object schemas associated with each node in the API query. Generally, the plurality of subqueries are generated to resolve the requested object and any attribute data objects of the requested object. Subsequently, the plurality of subqueries can be organized into an execution plan that resolves the requested data object and attribute data objects of the requested object using a minimal number of distinct subqueries. In some embodiments, the subqueries can be joined or coalesced together into a single query that resolves data objects across a plurality of services or data sources, as discussed in further detail below.

Generally, the execution plan may be used to define an order in which data objects are to be resolved in order to satisfy a received API query. The execution plan may be structured as a graph including a plurality of execution levels. The root node of the execution plan may be the ultimate object to be resolved in order to satisfy the received API query (i.e., the object an application has requested to be committed to or retrieved from one or more data stores 140). Nodes in lower execution levels of the execution plan may represent attributes of a given data object that are to be resolved prior to resolution of that data object. Generally, attributes of the ultimate object to be resolved may be placed in the second execution level of the execution plan (i.e., have a distance of 1 from the root node of the execution plan), and subsequent attributes may be placed at progressively lower levels of the execution plan (i.e., have increasing distances from the root node of the execution plan) based on the position of the object including these attributes in the execution plan.

Further, the execution plans may be generated for each received API query to facilitate the execution of each API query according to the unique navigable path through the graph projection of the API. In some embodiments, the execution plan generated for a specific API request (which, as discussed, represents a specific navigable path through the graph projection of the API) may be cached at application server 130 or otherwise stored at schema data store 150 for future use. Generally, the execution plan may be stored with information associating the execution plan with a specific API query, with specific identifiers in the API query replaced by wildcard characters. When API service 132 receives a query, API service 132 can search the cache for an execution plan associated with a query matching the received query. If API service 132 finds a matching query, API service 132 can retrieve the associated execution plan and provide that execution plan to request processor 134 for execution. Otherwise, API service 132 can generate an execution plan for the received API query, as discussed herein, and commit the generated execution plan to cache or storage for future use.

In some embodiments, the plurality of subqueries may be directed to resolving data objects against data sources maintaining the data objects in similar data structures. For example, assume that a first data object can includes a second data object as an attribute, and the second data object is defined as a data object that can be maintained by one of a plurality of different systems (e.g., stored in multiple user data stores 140). To resolve the second data object, a naïve approach may entail generating a subquery for the second data object to execute against each of the plurality of different systems. However, because the plurality of different systems may maintain the second data object in data repositories with substantially similar data structures (e.g., data structures sharing a number of attributes, such as an object identifier, a foreign key, etc.), it may be more efficient to query the plurality of different systems using a single subquery. Thus, the generated subquery may effectuate a query against the plurality of different systems, joined together into a single subquery including the same parameters.

As discussed, in some embodiments, the data objects may further be resolved based on parent-child relationships between the data objects defined in the object schemas associated with each data object. In such a case, the data objects to be resolved in order to satisfy an API query may include an object defined as an ultimate parent object to be returned as a result of the API query and a plurality of children data objects that are to be resolved prior to resolution of the ultimate parent object. These children data objects, as discussed above, may be defined in object schemas, and the object schemas may include information identifying the service provider that maintains each data object and the properties of each data object. In order to resolve children data objects before resolving the parent data objects. API service 132 generally uses the parent-child data object relationships to generate the execution plan. The execution plan generated to execute the API query generally may be structured as a graph in which the ultimate parent object to be resolved in order to execute the API query is positioned as the root node of the graph, and data objects other than the ultimate parent object are inserted into the graph as child nodes based on parent-child relationships between the data objects.

In some embodiments, API service 132 can optimize the generated execution plan prior to providing the execution plan to request processor 134 for execution. To optimize the execution plan, API service 132 can examine the children data objects of a given parent data object to identify subqueries that can be coalesced into a single subquery against a given service or data source, or, in some cases, a single subquery against a union of a plurality of services or data sources. As discussed, to increase the efficiency of data object resolution for children data objects that can be resolved against the same data source or against different data sources having similar data structures, a single subquery can be generated for those children data objects. Children data objects, or other attributes of a data object, resolvable against different services or data sources may be resolved substantially in parallel, and may be included in the same level of an execution plan for the plurality of subqueries.

After API service 132 generates an execution plan representing the order in which data objects are to be resolved in order to execute the API query or retrieves the execution plan from cache, API service 132 can pass a data structure containing the execution plan to a request processor 134 for execution. The data structure containing the execution plan may be, for example, a structured text file identifying the data objects to be resolved and the order in which the data objects are to be resolved, a graph data object including each data object as a node, with each node identifying connections to other nodes (if any), or other appropriate data structure. In some embodiments, API service 132 can traverse the execution plan to execute subqueries in different execution levels of the execution plan substantially sequentially and execute subqueries in the same execution level of the dependency graph substantially in parallel, as discussed in further detail herein. In some embodiments, subqueries to resolve the data objects in a particular branch of the execution plan are executed starting with the data objects in the lowest execution level of the execution plan and progressively executing subqueries to resolve data objects in higher execution levels of the execution plan.

Request processor 134 generally is configured to transmit the plurality of subqueries generated for the one or more data objects to the appropriate services (e.g., to an identified data store 140 or other service that maintains each data object) in order to execute the API query and return a result of the API query to a requesting client application executing on client device 120. Regardless of whether request processor 134 receives an optimized execution plan from API service 132, request processor can execute the API query by traversing the execution plan on a depth-first basis or on a breadth-first basis. If the dependency graph is traversed on a depth-first basis, different branches of a dependency graph may be resolved sequentially until the ultimate data object identified in the API query is resolved. If the execution plan is traversed on a breadth-first basis, request processor 134 can execute subqueries at any given execution level of the execution plan substantially in parallel and execute the subqueries at different execution levels of the execution plan sequentially starting with resolution of the data objects at the lowest level of the execution plan and ending with resolution of the ultimate data object identified in the API query.

The set of subqueries included at a given level of the execution plan may include a minimal number of subqueries based on the number of different services that maintain the data objects to be resolved at that level of the execution plan. As discussed herein, where a data object can be resolved against a plurality of services or data stores 140 having similar data structures, the subquery generated to resolve that data object may be structured as a query against the combination, or union, of the plurality of services or data store 140. Additionally, where multiple data objects can be resolved against a single service or data store 140, a single subquery can be generated to coalesce resolution of the multiple data objects into a single operation. After the set of subqueries has been optimized to account for union relationships across different services and resolution of multiple data objects against a single service, the set of subqueries generated for the data objects at a given level of the execution plan can be transmitted substantially in parallel to the appropriate services for execution. By transmitting the set of subqueries substantially in parallel, resolution of unrelated objects may be performed without having to wait for resolution of one object prior to resolution of an unrelated object.

Data stores 140 generally are repositories storing data that request processor 134 can access to satisfy requests for data received at application server 130. As illustrated, each data store 140 generally includes user data 142 and other application-related data in a sortable and searchable state (e.g., in a relational database, a non-relational database, in a flat data store, etc.). In response to a query received from request processor 134 at application server 130, data store 140 can return data objects matching the parameters included in the request, and request processor 134 may perform additional processing on the returned data before providing the data to a client device 120 via API service 132.

Schema data store 150 generally is a repository for storing object schema definition files for each node, or query, available in an API. As illustrated, schema data store 150 includes API schema repository 152. Data stored in API schema repository 152 may define one or more functions provided by the API and data objects returned as a response to the one or more functions of the API or created through an invocation of one or more functions of the API. In some cases, schema data store 150 may also store a graph projection of the API that API service 132 can use to identify a function invoked by an API query and the data objects to resolve in order to satisfy the API query. The graph projection of the API may include functions defined by the developer of the API, as well as extensions added to the API by other developers.

Example Object Schema and Execution Plan

FIG. 2 illustrates an example object schema 200 defining a data object and a plurality of attributes of the data object, according to an embodiment of the present disclosure. Object schema 200 may be structured as an eXtensible Markup Language (XML) file, a JavaScript Object Notation (JSON) file, or any other type of parseable data file. While FIG. 2 illustrates an invoice as an example parent data object, it should be recognized by one of ordinary skill in the art that any sort of data construct that can be represented as a parent data object with one or more child data objects as attributes can be implemented using a similar object schema definition.

As illustrated, the "invoice" data object is defined in object schema 200 as an object including three different attributes: "invoice," "contact," and "lines." Each of these attributes is defined in terms of a data type and a provider that maintains the attribute. As illustrated, the "transactionDate" attribute is defined as a date primitive supported by a database system and maintained by a service provider at "server1.host.net". The "contact" attribute is defined as an object of type "contactObject" and is maintained by a service provider at "server1.host.net". Finally, "lines" is defined as an array of objects of type "lineObject" and is maintained by a service provider at "server2.host.net". The "contactObject" and "lineObject" data objects are defined in object schema 200 as an object having the "invoice" data object as a parent object and having a plurality of attributes that are primitive data types. The "invoice" data object further includes a provider attribute indicating that the "invoice" data object is maintained by a service provider at "server3.host.net". In this example, the "invoice" data object may be considered to be the ultimate parent object returned in response to a read request or written to a data store in response to a write request. The child attributes (i.e., the "transactionDate" primitive and "contactObject" and "lineObject" data objects) may be resolved prior to resolution of the invoice object, as discussed above. Further, because the "transactionDate" primitive and "contactObject" data object share the same service provider (i.e., are identified in the object schema as being maintained by the service provider at "server1.host.net"), individual subqueries to resolve the "transactionDate" primitive and "contactObject" data object may be coalesced into a single subquery against "server1.host.net".

Figure 3:
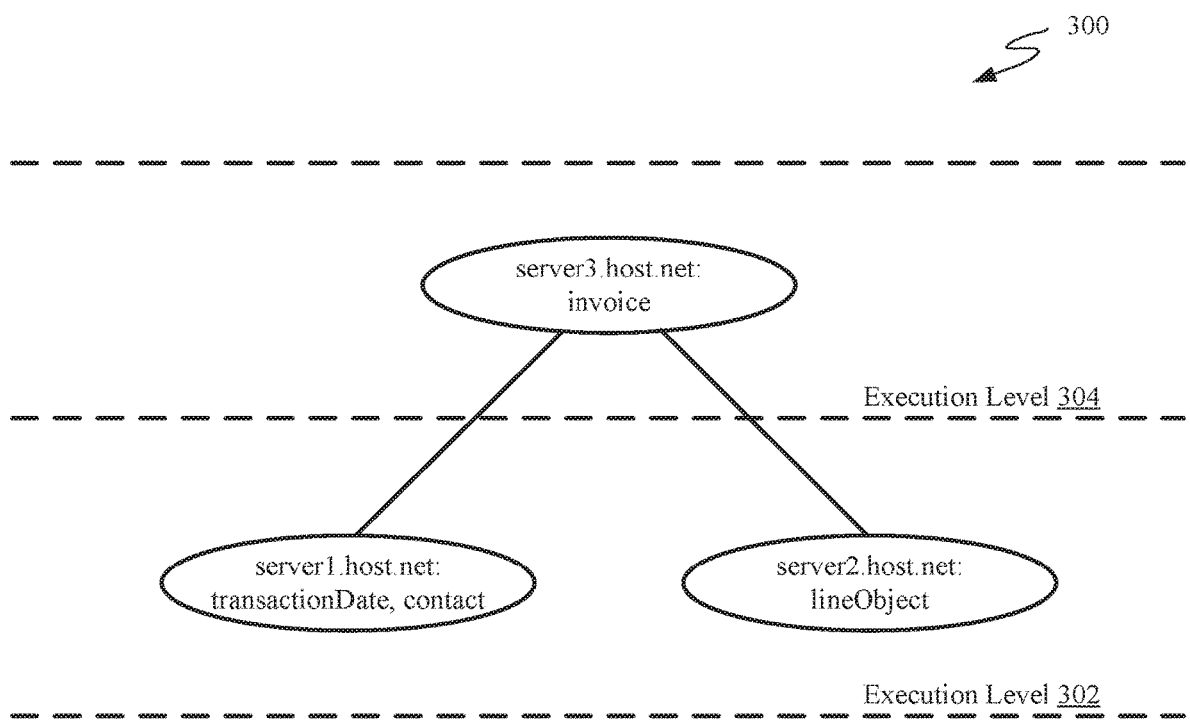
FIG. 3 illustrates an example graph representing an execution plan for resolving the object and the plurality of attribute objects defined in the object schema of FIG. 2.

Based on object schema 200 defining the "invoice" data object and the invoice, contact, and lines attributes, API service 132 can generate an execution plan 300 illustrated in FIG. 3 to resolve the "invoice" data object. As illustrated, execution plan 300 may result in the creation of a graph with a plurality of levels in the graph. Each level of the graph represents subqueries that can be executed substantially in parallel to resolve data objects that are to be resolved prior to resolution of data objects in a higher level of the graph. To resolve the "invoice" data object illustrated by object schema 200 in FIG. 2, the resulting execution plan 300 may include two execution levels: execution level 302, which resolves the attributes of the "invoice" data object, and execution level 304, which resolves the "invoice" data object itself.

As illustrated, execution level 302 includes a set of subqueries optimized based on the service provider information included in object schema 200 for each of the attributes. Because the "transactionDate" primitive and contact data object are defined in object schema 200 as maintained by the same provider (i.e., maintained by service1.host.net), API service 132 can generate a single subquery to resolve both the "transactionDate" primitive and "contact" data object. Further, the attributes resolved by executing a subquery against "server1.host.net" do not share or have a substantially similar data structure as the attribute resolved by executing a subquery against "server2.host.net" (i.e., neither the "transactionDate" primitive nor contact data object share attributes with the "lineObject" data objects maintained by "server2.host.net"). Thus, a subquery executed against "server1.host.net" to resolve the "transactionDate" primitive and contact data object may be executed substantially in parallel with the subquery executed against "server2.host.net" to resolve the "lineObject" data objects for a given "invoice" data object.

After the subqueries associated with the data objects at execution level 302 are transmitted to their respective services for execution, execution of the generated subqueries may proceed to execution level 304. As illustrated, execution level 304 is associated with the final resolution of the "invoice" data object, and any queries to finalize resolution of the "invoice" data object may be performed against "server3.host.net". After the "invoice" data object is resolved, application server 130 can return the "invoice" data object to the client device 120 as the result of the API query invoked by an application executing on client device 120, both of which may be defined by object schema definition files stored in API schema repository 152.

Figure 4:
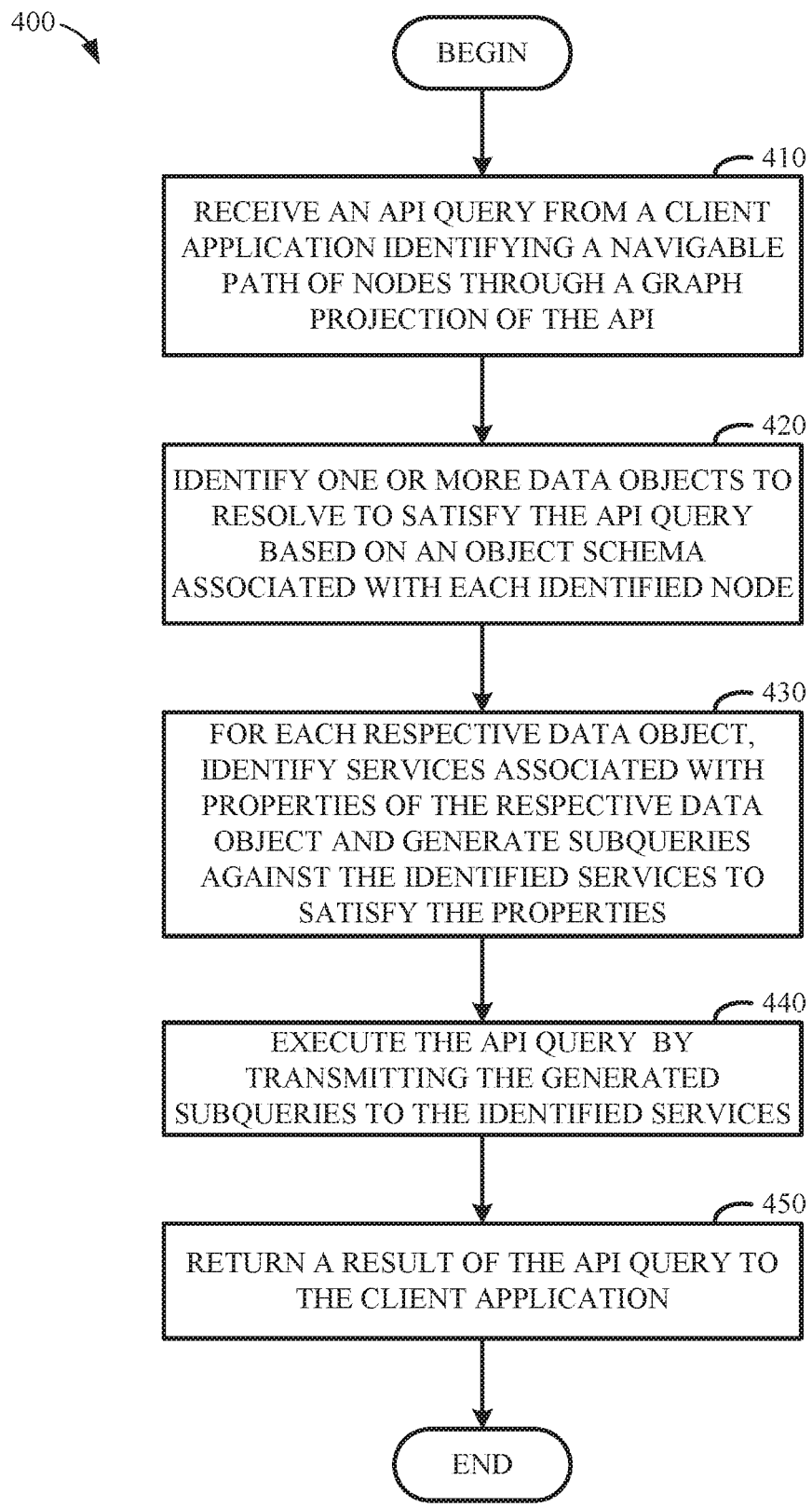
FIG. 4 illustrates example operations for executing an API query using an execution plan generated based on union relationships defined between different data objects in an object schema-based API.

Example Computer-Implemented Method for Executing API Queries Across Different Providers FIG. 4 illustrates example operations 400 for executing data queries in an object schema-based application programming interface (API) based on the providers identified for different attributes of a data object and union relationships defined for data objects resolved in response to the data query.

As illustrated, operations 400 begin at block 410, where a system receives an API query from a client application. The API query specifies a function to be invoked in order to read data from or write data to one or more data stores 140. The function may be identified as a navigable path through a graph projection of the API. As discussed, the navigable path through the graph projection of the API may include a plurality of nodes, and each node in the graph projection of the API may be defined according to an object schema that identifies the data objects maintained by that node, the functions that can be performed on those data objects, and parent-child relationships for each of the identified data objects.

At block 420, the system identifies one or more data objects to resolve in order to satisfy the received API query. The one or more data objects may be identified, at least in part, from object schemas associated with each node in the navigable path through the graph projection of the API identified in the query. As discussed, the object schemas generally define the functions supported by each node in the query, data objects associated with a node, and the attributes of each data object. Each attribute of a data object generally includes, without limitation, the data type of each attribute and information identifying the service provider (e.g., the specific data store 140) at which each attribute is maintained.

At block 430, for each respective data object of the identified one or more data objects, the system identifies services associated with the properties of the respective data object and generates one or more subqueries against the identified services to satisfy the properties of the data object. As discussed, the generated one or more subqueries may be generated and organized into an execution plan or other graph-based execution plan where attributes of a data object are resolved prior to resolution of the data object itself. In some embodiments, the execution plan may be generated based on parent-child relationships between different data objects. Further, the execution plan may include subqueries against multiple services (e.g., multiple data stores 140) for data objects that are maintained by multiple services having substantially similar data structures (e.g., in a union relationship). Still further, the execution plan may include subqueries that resolve multiple attributes of a data object that are maintained by the same service, as discussed above.

At block 440, the system executes the API query by transmitting the generated subqueries to the identified services. The generated subqueries are generally transmitted to the identified services according to the execution plan generated at block 430. In some embodiments, the system can execute the API query by initially executing the subqueries used to resolve the data objects at the lowest level of the execution plan and subsequently resolving data objects at progressively higher levels of the execution plan until the root data object is resolved. For the data objects at a given level of the execution plan, the generated subqueries can be transmitted to their respective services substantially in parallel (i.e., in a manner that execution of a subquery to resolve a first object at a given level of the execution plan does not depend upon the resolution of a second, unrelated data object at the same level of the execution plan).

At block 450, the system returns a result of the API query to the client application.

In some embodiments, identifying the one or more object to resolve to satisfy the query includes traversing the navigable path through the graph projection of the API. As discussed, the navigable path includes a plurality of nodes of the graph projection of the API. For each node, the system examines the object schema associated with the node, and the object schema generally includes information specifying the one or more objects to be resolved for the node.

In some embodiments, executing the subquery comprises generating at least a first request and a second request. The first request is generated to resolve a first subquery of the one or more generated subqueries against a first service, and the second request is generated to resolve a second subquery of the one or more subqueries against a second service. The system transmits, substantially in parallel, the first request to the first service and the second request to the second service for execution. Generally, transmitting requests to services substantially in parallel includes submitting the first request and the second request to their respective services in such a manner that transmission of one request does not depend on the completion of processing for the other request. As discussed, by transmitting these requests, which may be for data objects that can be resolved independently, substantially in parallel, the resolution of one of these independently resolvable objects may be performed without waiting for the resolution of another one of these independently resolvable objects.

In some embodiments, the system can execute the API query by identifying a plurality of the one or more subqueries to be resolved against a common service. The identified plurality of subqueries may be coalesced into a single subquery against the common service. An execution plan is generated for the generated one or more subqueries associated with each data object, where the execution plan replaces the identified subqueries with the single subquery against the common service. As discussed, by coalescing subqueries directed to the same service into a single request against that service, the system can reduce the total number of subqueries executed in order to satisfy an API query.

In some embodiments, the subqueries identified as subqueries to be resolved against the common service may include identifying subqueries associated with one or more data objects based on dependencies between the one or more data objects. For example, the subqueries to be resolved against a common service that are coalesced into a single subquery may be subqueries to resolve data objects at a given execution level of the execution plan. Further, in some embodiments, identifying the plurality of subqueries to be resolved against the common service may include identifying subqueries associated with a plurality of the one or more data objects for which object dependencies have already been satisfied.

In some embodiments, the order in which the one or more requests are to be satisfied may be an order in which subqueries associated with a request to satisfy a first data object defined as a dependency of a second data object is executed after subqueries associated with a request to satisfy the second data object.

Figure 5:
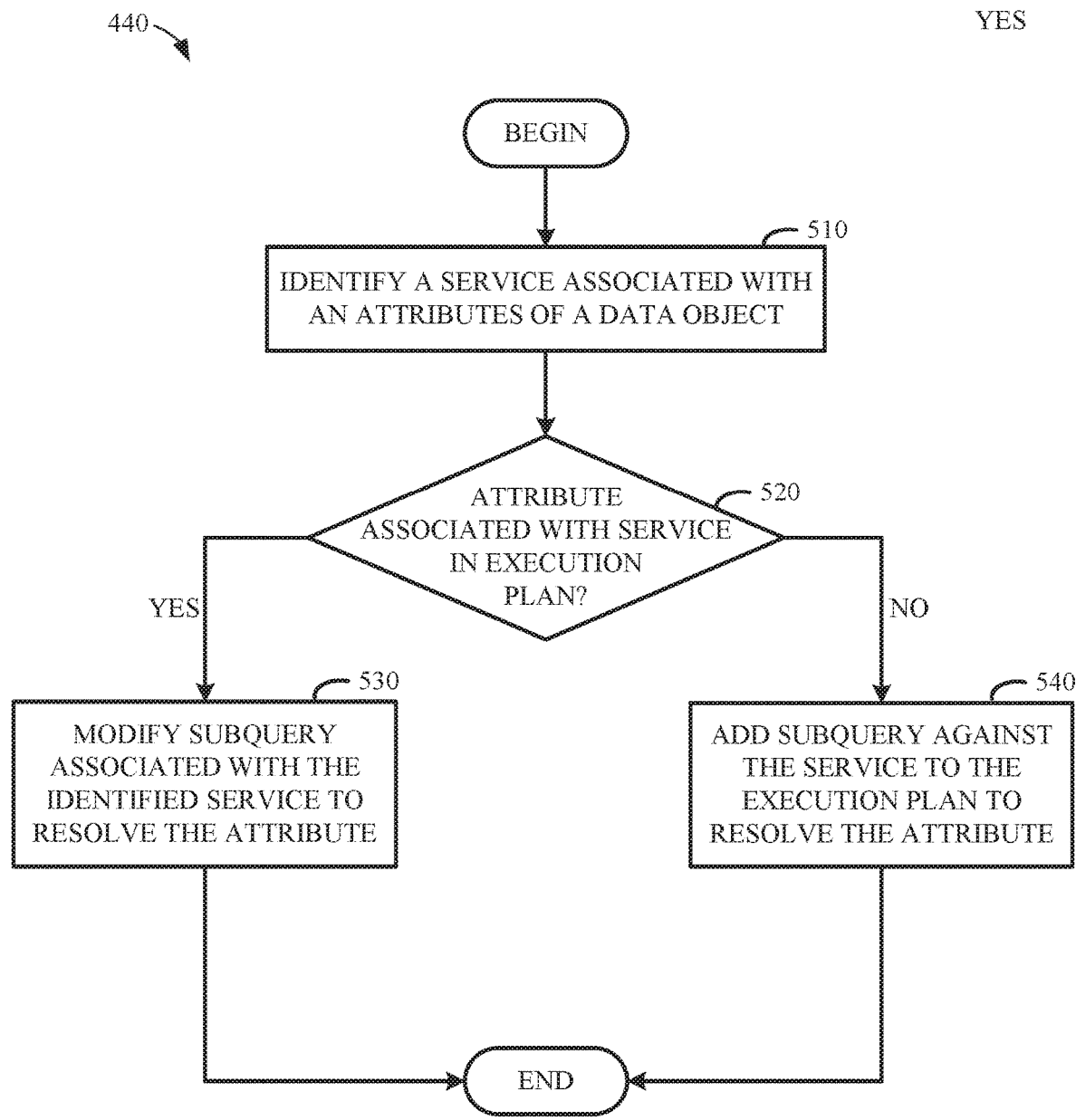
FIG. 5 illustrates example operations for generating an execution plan for resolving objects based on union relationships defined between different data objects in an object schema-based API.

FIG. 5 illustrates example operations 430 for generating an execution plan for executing subqueries against one or more services to resolve an attribute (or property) of a data object.

As illustrated, operations 430 begin at block 510, where a system identifies a service associated with an attribute of a data object. As discussed above, the information identifying the service or services associated with an attribute of a data object may be included in one or more object schema definitions (stored, for example, in schema data store 150). In some embodiments, the information identifying the services associated with an attribute of a data object may indicate that the data object is maintained by multiple services (e.g., multiple data stores 140). In such a case, the data object may be resolved through a query against a union of the multiple identified sources.

At block 520, the system determines whether the attribute is associated with a service already included in the execution plan. In some embodiments, the determination of whether an attribute is associated with a service already included in the execution plan may examine services associated with other data objects at the same level of the execution plan in order to determine whether the attribute can be resolved with other attributes maintained by the same service. If the system determines that the attribute is associated with a service already included in the execution plan, at block 530, the system modifies a subquery associated with that service to resolve the attribute, along with other attributes resolved using the subquery against the identified service. By modifying the subquery to be executed against an identified service to resolve multiple attributes, attributes maintained by a single service can be resolved using a single, rather than multiple, subqueries.

If, at block 520, the system determines that the attribute is not associated with a service that is already included in the execution plan, then at block 540, the system adds a subquery against the identified service to the execution plan. The subquery may be added to the appropriate level of the execution plan based on the level in the execution plan at which the data object including the attribute is to be resolved. In some embodiments, attributes of a data object may be included at a lower level of an execution plan than the data object including that attribute.

Example System

Figure 6:
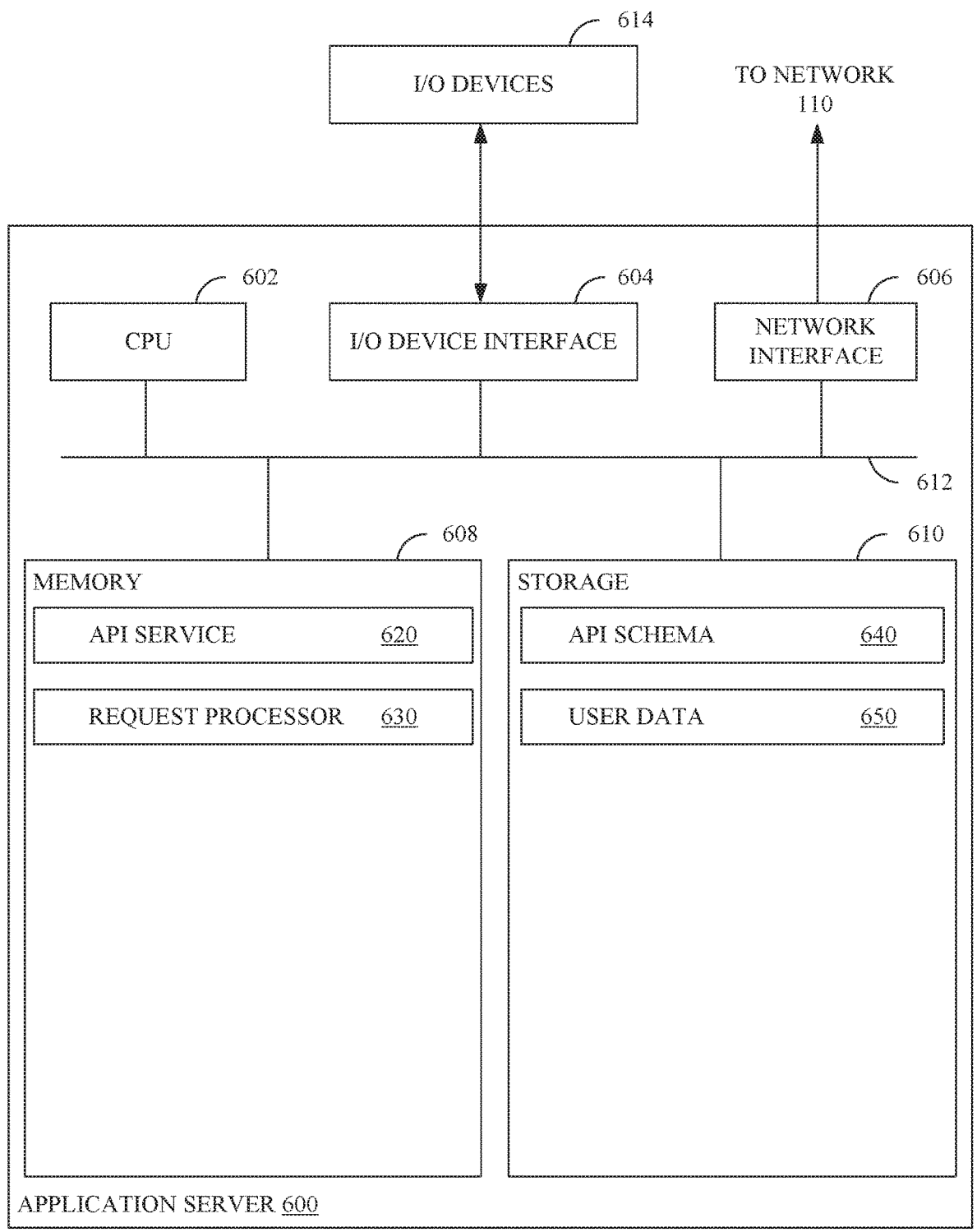
FIG. 6 illustrates an example computing system with which embodiments of the present disclosure may be implemented.

FIG. 6 illustrates an example system 600 for executing data queries in an object schema-based application programming interface (API) based on relationships between data objects and provider information associated with attributes of a data object, according to embodiments of the present disclosure. For example, system 600 may be representative of application server 130 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an API service 620 and a request processor 630. API service 620 generally receives a request to execute one or more functions provided by an API from a client device 120 described with respect to FIG. 1 (e.g., via network interface 606). The request generally may be structured as a navigable path through a graph projection of an API, and the navigable path generally includes a plurality of nodes in the graph projection of the API. Each node is associated with an object schema that defines the data objects associated with a node in the graph projection API, and each data object may include attributes defined as primitive data types or other data objects. In response to receiving the request, API service 620 examines the object schemas associated with each node in the navigable path through the graph projection of the API to identify the data objects to be resolved in order to satisfy the request. The data objects to be resolved in order to satisfy the request generally includes the requested data object and any attributes of the requested data object. Based on the object schema defining each of the data objects to be resolved, API service 620 generates a plurality of subqueries to resolve the data objects and an execution plan for the plurality of subqueries. The execution plan generally defines the order in which subqueries are executed. As discussed above, the execution plan may be optimized to minimize the number of queries executed at a given level of the execution plan. Further, in some embodiments, the execution plan may include subqueries that resolve data objects by querying multiple data sources joined together in a single subquery.

Request processor 630 generally uses the execution plan generated by API service 620 to execute the one or more subqueries to resolve the data objects and satisfy the API query. In some embodiments, request processor 630 can optimize the execution plan to execute subqueries at a given execution level of the execution plan substantially in parallel. As discussed, the subqueries at a given execution level may resolve data objects that are unrelated (i.e., do not require the resolution of other data objects at the same level of the execution plan). By transmitting the subqueries substantially in parallel, request processor 630 can cause data objects at a given level of the execution plan to be resolved simultaneously or near-simultaneously rather than sequentially, which may accelerate the process of resolving the data objects related to an API query.

Storage 610 includes an API schema 640 and user data 650. API schema 640 generally provides a data store that includes object schema definition files for each of the nodes in a graph projection of the API, which may include object schemas defined by a developer of the API or by external developers adding extensions to the API. In some cases, API schema 640 can additionally store a graph projection of the API, which may be updated over time as developers add extensions to the API. The object schemas associated with each node in the graph projection of the API may include information defining the data objects associated with each node in the graph projection of the API and attributes of each data object, including information about whether the data object is a child object of another object and/or whether the data object is a parent data object to other child objects.

User data 650 generally includes data that application gateway system stores for an application and can provide in response to a query received at a request processor. User data 650 may be maintained, for example, in a relational database, and a request processor can execute database queries on user data 650 based on the parameters included in the query and formatted according to a variability schema associated with the invoked API function call. In some cases, user data 650 may be maintained in a non-relational data store, and request processor can generate queries for user data 650 based on, for example, key-value pairs or other data points.

The preceding description provides examples, and is not limiting of the scope, applicability, or embodiments set forth in the claims. Various modifications to these embodiments will be readily apparent to those skilled in the art, and the generic principles defined herein may be applied to other embodiments. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for executing data queries in an object schema-based application programming interface (API), comprising:
   receiving an API function call from a client application, wherein:
      the API function call identifies a navigable path through a graph projection of the API, and
      the navigable path includes a plurality of nodes in the graph projection of the API, each node of the plurality of nodes representing a function to be executed in order to satisfy the API function call;
   identifying one or more data objects to resolve to satisfy the API function call, based at least in part on an object schema associated with each node in the API function call; and
   for each respective data object of the one or more data objects:
      identifying one or more services associated with properties of the respective data object, and
      generating one or more subqueries to the identified one or more services to satisfy the properties of the respective data object; and
   executing the API function call by transmitting the generated one or more subqueries associated with each data object to the identified one or more services; and
   returning a result of the API function call to the client application.

2. The method of claim 1, wherein identifying the one or more data objects to resolve to satisfy the API function call comprises:
   traversing the navigable path through the graph projection of the API; and
   for each node in the navigable path, examining the object schema associated with the node for information specifying the one or more objects to be resolved for the node.

3. The method of claim 1, wherein executing the API function call comprises:
   generating a first request to resolve a first subquery of the one or more subqueries against a first service;
   generating a second request to resolve a second subquery of the one or more subqueries against a second service; and
   transmitting, substantially in parallel, the first request to the first service and the second request to the second service for execution.

4. The method of claim 1, further comprising:
   identifying a plurality of the one or more subqueries to be resolved against a common service; and
   coalescing the identified plurality of the one or more subqueries into a single subquery against the common service; and
   generating an execution plan for the generated one or more subqueries associated with each data object, wherein the execution plan replaces the identified plurality of subqueries with the single subquery against the common service.

5. The method of claim 4, wherein identifying a plurality of the one or more subqueries to be resolved against a common service comprises identifying subqueries associated with the one or more data objects based on dependencies between the one or more data objects.

6. The method of claim 5, wherein an order in which one or more requests are to be satisfied comprises an order in which subqueries associated with a request to satisfy a first data object defined as a dependency of a second data object is executed after subqueries associated with a request to satisfy the second data object.

7. The method of claim 5, wherein identifying a plurality of the one or more subqueries to be resolved against a common service comprises identifying subqueries associated with a plurality of the one or more data objects for which object dependencies have already been satisfied.

8. An apparatus for executing data queries in an object schema-based application programming interface (API), comprising:
   a processor configured to:
      receive an API function call from a client application, wherein:
         the API function call identifies a navigable path through a graph projection of the API, and
         the navigable path includes a plurality of nodes in the graph projection of the API, each node of the plurality of nodes representing a function to be executed in order to satisfy the API function call;
      identify one or more data objects to resolve to satisfy the API function call, based at least in part on an object schema associated with each node in the API function call; and
      for each respective data object of the one or more data objects:
         identify one or more services associated with properties of the respective data object, and
         generate one or more subqueries to the identified one or more services to satisfy the properties of the respective data object; and
      execute the API function call by transmitting the generated one or more subqueries associated with each data object to the identified one or more services, and
      return a result of the API function call to the client application; and
   a memory.

9. The apparatus of claim 8, wherein the processor is configured to identify the one or more objects to resolve to satisfy the API function call by:
   traversing the navigable path through the graph projection of the API; and
   for each node in the navigable path, examining the object schema associated with the node for information specifying the one or more objects to be resolved for the node.

10. The apparatus of claim 8, wherein the processor is configured to execute the API function call by:
   generating a first request to resolve a first subquery of the one or more subqueries against a first service;

generating a second request to resolve a second subquery of the one or more subqueries against a second service; and transmitting, substantially in parallel, the first request to the first service and the second request to the second service for execution.

11. The apparatus of claim 8, wherein the processor is further configured to:
identify a plurality of the one or more subqueries to be resolved against a common service; and
coalesce the identified plurality of the one or more subqueries into a single subquery against the common service; and
generate an execution plan for the generated one or more subqueries associated with each data object, wherein the execution plan replaces the identified plurality subqueries with the single subquery against the common service.

12. The apparatus of claim 11, wherein the processor is configured to identify a plurality of the one or more subqueries to be resolved against a common service by identifying subqueries associated with the one or more data objects based on dependencies between the one or more data objects.

13. The apparatus of claim 12, wherein an order in which one or more requests are to be satisfied comprises an order in which subqueries associated with a request to satisfy a first data object defined as a dependency of a second data object is executed after subqueries associated with a request to satisfy the second data object.

14. The apparatus of claim 12, wherein the processor is configured to identify a plurality of the one or more subqueries to be resolved against a common service by identifying subqueries associated with a plurality of the one or more data objects for which object dependencies have already been satisfied.

15. An apparatus for executing data queries in an object schema-based application programming interface (API), comprising:
a request processor configured to:
receive an API function call from a client application, wherein:
the API function call identifies a navigable path through a graph projection of the API, and
the navigable path includes a plurality of nodes in the graph projection of the API, each node of the plurality of nodes representing a function to be executed in order to satisfy the API function call;
identify one or more data objects to resolve to satisfy the API function call, based at least in part on an object schema associated with each node in the API function call; and
for each respective data object of the one or more data objects:
identify one or more services associated with properties of the respective data object, and
generate one or more subqueries to the identified one or more services to satisfy the properties of the respective data object; and
execute the API function call by transmitting the generated one or more subqueries associated with each data object to the identified one or more services, and return a result of the API function call to the client application; and
one or more data stores storing data associated with the identified one or more data objects.

16. The apparatus of claim 15, wherein in order to identify the one or more objects to resolve to satisfy the API function call, the request processor is configured to:
traverse the navigable path through the graph projection of the API; and
for each node in the navigable path, examine the object schema associated with the node for information specifying the one or more objects to be resolved for the node.

17. The apparatus of claim 15, wherein in order to execute the API function call, the request processor is configured to:
generate a first request to resolve a first subquery of the one or more subqueries against a first service;
generate a second request to resolve a second subquery of the one or more subqueries against a second service; and
transmit, substantially in parallel, the first request to the first service and the second request to the second service for execution.

18. The apparatus of claim 15, wherein the request processor is further configured to:
identify a plurality of the one or more subqueries to be resolved against a common service;
coalesce the identified plurality of the one or more subqueries into a single subquery against the common service; and
generate an execution plan for the generated one or more subqueries associated with each data object, wherein the execution plan replaces the identified subqueries with the single subquery against the common service.

19. The apparatus of claim 18, wherein the request processor is configured to identify a plurality of the one or more subqueries to be resolved against a common service by identifying subqueries associated with the one or more data objects based on dependencies between the one or more data objects.

20. The apparatus of claim 19, wherein the request processor is configured to identify a plurality of the one or more subqueries to be resolved against a common service by identifying subqueries associated with a plurality of the one or more data objects for which object dependencies have already been satisfied.

* * * * *